United States Patent Office 2,735,185
Patented Feb. 21, 1956

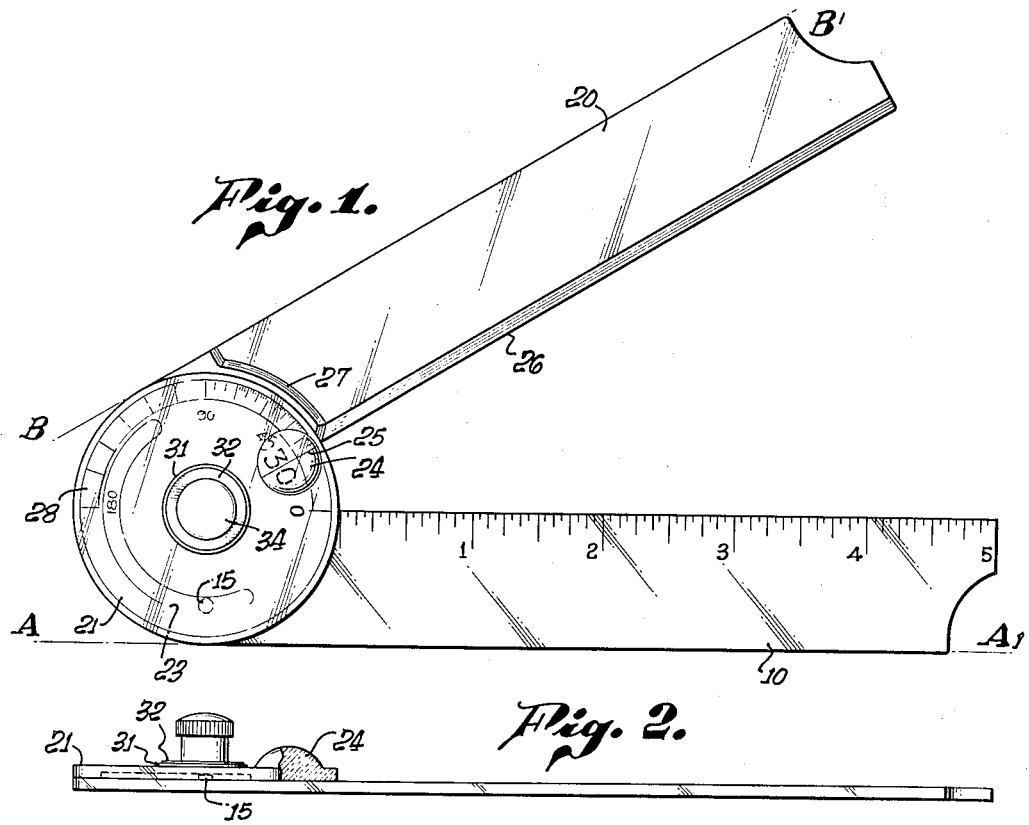
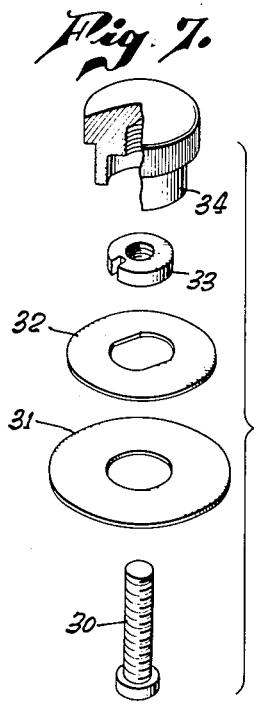
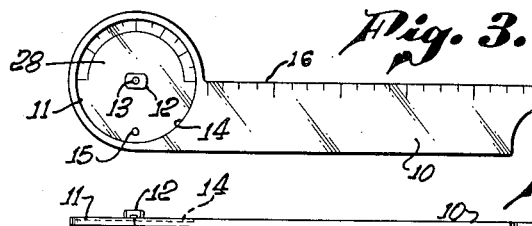
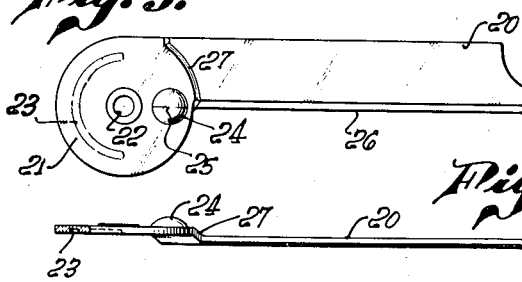
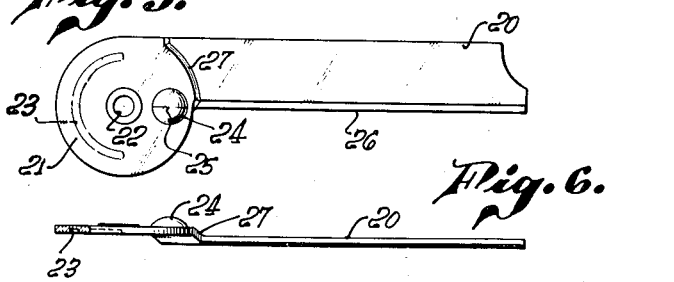
INVENTOR.
MAX NAPHTAL
BY
AGENT.

2,735,185
PROTRACTOR

Max Naphtal, Los Angeles, Calif., assignor of one-half to Irving Naphtal, Los Angeles, Calif.

Application March 23, 1953, Serial No. 343,899

3 Claims. (Cl. 33—120)

This invention relates to drafting instruments, and more particularly to protractors of the type useful for measuring angles, and for guiding a ruling pen in the process of drafting.

The use of protractors in drafting practice is well known, but protractors heretofore available to draftsmen have lacked many advantageous features, and moreover have not permitted the carrying out of certain types of drafting operations, which are possible with the protractor of my invention.

One of the objects of the invention is to provide an improved instrument for measuring angles with considerable accuracy.

Another object of the invention is to provide a protractor adapted for use on a drawing board and which can be pre-set to an accurate angle, following which it can be used as a ruling guide.

Another object of the invention is to provide an apparatus which can hold a drafting aid such as a celluloid triangle, ruler or the like, in slidable relationship to a straight edge, the relationship being one of a variable, pre-settable angle.

Another object of the invention is to provide an improved magnifying means for the angle scale of a variable protractor which is virtually unbreakable, convenient in use, readily manufactured, and easily assembled.

Other objects of the invention will appear as the description thereof proceeds.

The drawings appended hereto serve to illustrate an embodiment of my invention. In the drawings:

Figures 1 and 2 are respectively the plan and elevation views of the assembled protractor.

Figures 3 and 4 are respectively the plan and elevation views of the lower half of the protractor.

Figures 5 and 6 are respectively the plan and elevation views of the upper half of the protractor.

Figure 7 is an "exploded" view of the screw, washer and lock nut assembly serving to hold the two portions of the protractor in pivotal assembly.

Turning now to Figures 3 and 4 for illustration of the lower arm unit of the protractor, it will be seen that this comprises a flat sheet of material, which may be celluloid although I prefer one of the newer plastics, such as cellulose acetate, and more particularly polymethylmethacrylate, such as is available under the trade names of "Lucite" and "Plexiglas." As is well-known, these materials are non-brittle, tough, transparent and moldable. The device shown in Figures 3 and 4 comprises a straight portion 10 presenting two parallel straight edges which serve as guides for ruling pens, pencils and the like; and a generally circular portion 11, bearing on its upper portion and centrally of the circular portion a raised boss 12 having the shape of a cylinder with two sides flattened. The boss is penetrated by a central hole 13. A circular depression 14 of about the thickness of a piece of paper and slightly smaller in diameter than the diameter of the circular portion of the protractor arm is provided to receive a circular scale 28 which may be printed on paper. A small cylindrical projection 15 is preferably provided also in the position indicated on Figures 3 and 4, which serves as a stop and co-acts with a slot to be described in connection with Figures 5 and 6. It also acts to index the position of scale 28 by cooperating with a hole therein. The entire arm of Figures 3 and 4 is in one piece, including the bosses 12 and 15.

Figures 5 and 6 show the upper arm of the protractor, which, like the lower arm, consists of a straightedge portion 20 having a generally circular end 21 with a central hole 22, and an indented slot 23 in the shape of an arc of a circle. A portion of Figure 6 has been cut away to show the slot 23 clearly. The circular end 21 of the upper arm is offset so that it lies above the straightedge portion 20 by a thickness equal to the thickness of the lower arm, as discernible particularly in Figure 6. This offset circular end 21 of the upper arm is connected to the straightedge portion 20 by a beveled section 27, as may be seen in particular from Figure 6. An important feature of this upper arm is that it bears on its upper surface a raised boss 24 which is cast in one piece with the arm itself, and which has the shape of a segment of a sphere. The boss 24 thus acts as a magnifier. The solid character of the boss 24 is made particularly apparent in Figure 2, which shows a partially cut-away section of the magnifying boss 24. A thin line 25 is engraved on the bottom side of the upper arm underneath the magnifying boss 24, and co-linear with the lower straightedge 26 of the straightedge portion 20 of the upper arm. The line of the lower straightedge 26 as seen in Figure 5, passes through the center of its circular portion 21, that is, through the center of the hole 22; and likewise the line of the upper straightedge 16 of the lower arm as shown in Figure 3 passes through the center of its circular portion, namely the center of the hole 13.

Figures 1 and 2 show how the two arms are assembled to form the protractor. The opening 22 has a bearing fit on the arcuate walls of boss 12 forming the pivotal connection for the hinge portions 11 and 21. The two arms are held together by the screw, washer and nut assembly shown in Figure 7, which is largely self-explanatory; both nuts 33 and 34 are threaded to receive the threaded portion of screw 30, and the knurled nut 34 bears down on washers 32 and 31. Washer 32 is conveniently warped slightly and made of spring-tempered metal, so that a resilient spring action is maintained after assembly. The boss 12 projects above the surface of hinge portion 21 sufficiently to receive flat washer 31 and warped spring washer 32, which is non-rotatively held on the boss by the latter's flat sides cooperating with the correspondingly shaped opening therein. Nut 33 can now be tightened against the end of boss 12 and only slightly deflects the warped washer 32 where it overlaps the inner portion thereof, whereby the two scale blades can be easily adjusted relative to each other and will be held lightly in adjustment. The counterbore in nut 34 straddles nut 32 so that the skirt thereof can be brought into engagement with washer 32 to tightly clamp the hinge discs together in adjusted position.

From Figures 1 and 2, it will be readily apparent how the magnifier acts to magnify both the indicator line 25 and the graduated paper scale 28 lying in the recessed portion of the lower arm. This facilitates rapid and accurate setting of the protractor to any desired angle. Also, from Figures 1 and 2, it will be apparent how the stop 15 which is attached to the lower arm co-acts with the circular indented slot 23 to prevent the protractor from being opened to more than 180°, although this is an optional feature. It is desirable, by way of increasing the usefulness of the instrument, to engrave a length scale on the lower arm, as may be seen from an inspection of Figures 1 and 2. Tightening the knurled nut 34 permits fixing the protractor at any desired angle, in a rigid and relatively immovable fashion.

Referring again to Figure 1, dotted lines A—A' and B—B' show how the protractor, when set at a given angle, is able to lie completely within two straight lines of the desired angle. Thus the protractor, for example set at the angle shown in Figure 1, may be placed against the horizontal straight-edge, represented by line AA—AA', of a drafting board, and another drafting instrument, such as a triangular ruler, a celluloid triangle, or the like may be placed against the upper edge of the protractor, indicated as line B—B', and all regardless of the length of the instrument applied to such upper edge.

It will be seen that the invention accomplishes its objects, providing a drafting instrument with all of the several advantages hereinbefore described and to be ascertained from the specification and drawings. It is to be understood that modifications within the spirit of the appended claims are not excluded from the purview of the invention.

Having described the invention, I claim:

1. In a drafting instrument of the type described, the combination of; a first flat arm comprising a parallel edged straight edge portion and an integral circular hinge portion having a shallow concentric recess therein of nearly the same diameter as the hinge portion, a separate printed graduated scale in said recess, a second arm comprising a parallel edges straight edge portion and an integral circular hinge portion offset so that the bottom surfaces of the straight edge portions are co-planar when the hinge portions are overlapped, said second arm being formed of a transparent, tough, moldable material and having a short focus magnifying lens cast integral on the hinge portion and disposed to magnify the portion of the scale lying below it, and means integral with the hinge portions interengaging to pivot the arms for relative angular movement the extent of which is indicated on the scale beneath the said lens.

2. The drafting instrument of claim 1 in which there is an index line beneath said lens, and the said scale and the hinge portion receiving the scale have integral means interengaging to orient the scale markings properly in respect to said index line whereby the angular relation of the two straight edge portions may be accurately indicated.

3. In a drafting instrument of the adjustable arm protractor type, in combination, two, one-piece units each having a parallel sided arm and a circular hinge disc, one arm being offset from the plane of its disc so that the arms are co-planar when the discs are overlapped, a pivot stud extending integrally upwardly from the lower disc, a hole in the upper disc closely receiving said stud to pivot the discs together, said stud having a non-circular end extending above the upper face of the upper disc, a screw extending axially through said stud, a warped spring washer having a correspondingly noncircular shaped hole fitting over said stud end, a nut on said screw engaging said stud end and overlying the innerportion of said washer to apply a friction load to said discs and a thumb nut engaging said screw, counterbored to clear said first nut and having a lower rim adapted to engage the washer and clamp the discs together in any adjusted position.

References Cited in the file of this patent

UNITED STATES PATENTS

| | | |
|---|---|---|
| 1,125,770 | Turgeon | Jan. 19, 1915 |
| 1,154,673 | Van Ness | Sept. 28, 1915 |
| 1,550,755 | Steinle | Aug. 25, 1925 |
| 1,690,832 | Owen | Nov. 6, 1928 |
| 1,726,314 | Rose | Aug. 27, 1929 |
| 1,952,344 | Webber | Mar. 27, 1934 |
| 2,438,653 | Ware | Mar. 30, 1948 |
| 2,502,039 | Floyd | Mar. 28, 1950 |
| 2,505,149 | Schoenberg | Apr. 25, 1950 |
| 2,611,184 | Baker | Sept. 23, 1952 |

FOREIGN PATENTS

| | | |
|---|---|---|
| 121,137 | Switzerland | June 16, 1927 |